(12) United States Patent
Jiang et al.

(10) Patent No.: US 12,434,867 B2
(45) Date of Patent: Oct. 7, 2025

(54) PROPELLER BLADE, PROPELLER, POWER ASSEMBLY, AND MULTI-ROTOR UNMANNED AERIAL VEHICLE

(71) Applicant: SZ DJI TECHNOLOGY CO., LTD., Shenzhen (CN)

(72) Inventors: Zailong Jiang, Shenzhen (CN); Qi Li, Shenzhen (CN); Xiaoyu Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 135 days.

(21) Appl. No.: 18/479,315

(22) Filed: Oct. 2, 2023

(65) Prior Publication Data
US 2024/0025573 A1    Jan. 25, 2024

Related U.S. Application Data

(63) Continuation of application No. PCT/CN2021/085981, filed on Apr. 8, 2021.

(51) Int. Cl.
*B64U 30/29* (2023.01)
*B64U 10/14* (2023.01)

(52) U.S. Cl.
CPC ............. *B64U 30/29* (2023.01); *B64U 10/14* (2023.01)

(58) Field of Classification Search
CPC .................................................... B64U 30/29
See application file for complete search history.

(56) References Cited

U.S. PATENT DOCUMENTS

| | | | | |
|---|---|---|---|---|
| 1,946,129 | A | * | 2/1934 | Cebulski ............... B64C 11/205 416/224 |
| 8,425,191 | B2 | * | 4/2013 | Ali ......................... F02C 6/206 416/90 R |
| 10,933,988 | B2 | * | 3/2021 | Beckman ................ B64C 27/57 |
| 2003/0107224 | A1 | | 6/2003 | Ito et al. |

FOREIGN PATENT DOCUMENTS

| | | | | |
|---|---|---|---|---|
| CN | 2734291 | Y | * 10/2005 | |
| CN | 204942080 | U | * 1/2016 | |
| CN | 205418069 | U | 8/2016 | |
| CN | 207106882 | U | * 3/2018 | ............ B64C 27/32 |
| CN | 207631488 | U | * 7/2018 | |
| CN | 108473194 | A | * 8/2018 | ............ B64C 11/00 |
| CN | 216762163 | U | 6/2022 | |
| GB | 557403 | A | 11/1943 | |

OTHER PUBLICATIONS

The World Intellectual Property Organization (WIPO) International Search Report for PCT/CN2021/085981 Jan. 12, 2022 6 Pages (including translation).

* cited by examiner

*Primary Examiner* — Justin M Benedik
(74) *Attorney, Agent, or Firm* — ANOVA LAW GROUP, PLLC

(57) ABSTRACT

A blade includes a main body and an edge disposed around a periphery of the main body. A part of the edge includes a soft layer and an intermediate layer connected between the soft layer and the main body. The intermediate layer includes a soft component and a hard component stacked one on another when viewing in a cross-section along a width direction of the blade or along a length direction of the blade.

19 Claims, 16 Drawing Sheets

PROPELLER BLADE, PROPELLER, POWER ASSEMBLY, AND MULTI-ROTOR UNMANNED AERIAL VEHICLE

CROSS-REFERENCE TO RELATED APPLICATION

This application is a continuation of International Application No. PCT/CN2021/085981, filed Apr. 8, 2021, the entire content of which is incorporated herein by reference.

TECHNICAL FIELD

The present disclosure relates to the field of unmanned aerial vehicles and, more particularly, to a propeller blade, a propeller, a power assembly, and a multi-rotor unmanned aerial vehicle.

BACKGROUND

Most multi-rotor unmanned aerial vehicles do not have protective covers, and propeller blades are mostly hard blades, which are relatively sharp. When a propeller blade hits a human body, it may cause harm to the human body easily. Further, the actual protective effect of most protective covers is relatively limited.

SUMMARY

In accordance with the disclosure, there is provided a blade including a main body and an edge disposed around a periphery of the main body. A part of the edge includes a soft layer and an intermediate layer connected between the soft layer and the main body. The intermediate layer includes a soft component and a hard component stacked one on another when viewing in a cross-section along a width direction of the blade or along a length direction of the blade.

Also in accordance with the disclosure, there is provided a propeller including a propeller hub and at least two propeller blades installed at the propeller hub. Each of the at least two propeller blades includes a main body and an edge disposed around a periphery of the main body. A part of the edge includes a soft layer and an intermediate layer connected between the soft layer and the main body. The intermediate layer includes a soft component and a hard component stacked one on another when viewing in a cross-section along a width direction of the propeller blade or along a length direction of the propeller blade.

Also in accordance with the disclosure, there is provided an unmanned aerial vehicle including a body, an arm mechanically coupled to the body, a driver installed at the arm, and a propeller. The propeller includes a propeller hub and at least two propeller blades installed at the propeller hub. The propeller is mounted at the driver through the propeller hub. Each of the at least two propeller blades includes a main body and an edge disposed around a periphery of the main body. A part of the edge includes a soft layer and an intermediate layer connected between the soft layer and the main body. The intermediate layer includes a soft component and a hard component stacked one on another when viewing in a cross-section along a width direction of the propeller blade or along a length direction of the propeller blade.

DETAILED DESCRIPTION OF THE EMBODIMENTS

Figure 1:
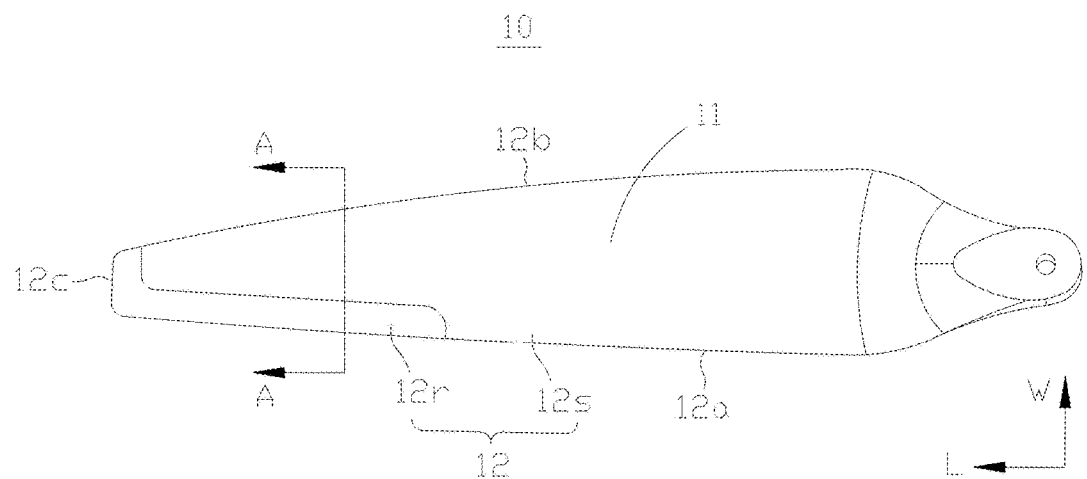
FIG. 1 is a schematic diagram of an exemplary propeller blade provided by one embodiment of the present disclosure.
Figure 2:
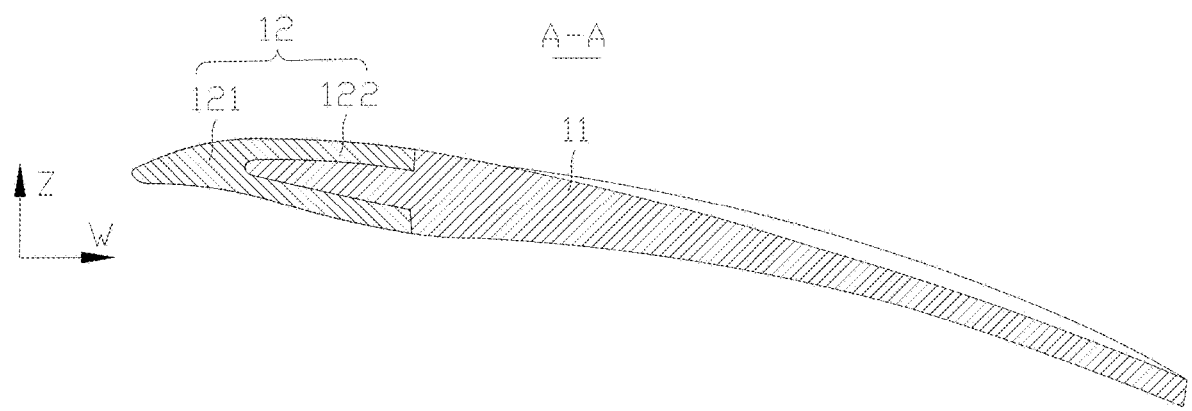
FIG. 2 is a cross-sectional view along A-A in FIG. 1.

The technical solutions of the present disclosure will be described below in conjunction with the drawings in the embodiments of the present disclosure. Obviously, the described embodiments are some of the embodiments of the present disclosure, but not all of the embodiments. Based on the embodiments in this disclosure, all other embodiments obtained by those of ordinary skill in the art without creative work shall fall within the scope of this disclosure.

The terminology used in the present disclosure is for the purpose of describing particular embodiments only and is not intended to limit the scope of the present disclosure. As used in the present disclosure and the claims, articles "a," "an," and "the" in singular form are intended to include plural unless the context clearly dictates otherwise.

The term "and/or" used in the description of the present disclosure and the claims refers to any combination and all possible combinations of one or more of the associated listed items, and includes these combinations.

The present disclosure provides a propeller blade 10 (a propeller blade is also simply referred to as "blade"). As shown in FIG. 1 to FIG. 4, the propeller blade 10 includes a main body 11 and an edge 12. The edge 12 is arranged around the main body 11. At least a part 12r of the edge is provided with a soft layer 121 away from the main body 11 and an intermediate layer 122 close to the main body 11. The soft layer 121 is connected to the main body 11 through the intermediate layer 122. In a cross-section of the intermediate layer 122 in a width direction W of the propeller blade 10, the intermediate layer 122 has a structure in which a soft component 1221 and a hard component 122 are stacked.

In the present embodiment, the soft layer 121 is disposed on at least a part 12r of the edge of the propeller blade 10. When the propeller blade 10 hits a human body, the soft layer 121 may act as a buffer, effectively reducing the damage to the human body. Further, in the cross-section of the intermediate layer 122 along the width direction W of the propeller blade 10, the intermediate layer 122 has the structure in which the soft component 1221 and the hard component 1222 are stacked. Therefore, the contact area between the soft component 1221 and the hard component 1222 may be increased, and the bonding strength between the soft component 1221 and the hard component 1222 may be effectively increased, such that the soft component 1221 is not easy to fall off from the main body 11.

The edge 12 includes a leading edge 12a of the propeller blade 10, a trailing edge 12b of the propeller blade 10, and a tip 12c of the propeller blade 10. When the propeller blade 10 rotates, the airflow flows from the leading edge 12a to the trailing edge 12b.

In some embodiments, the tip 12c of the propeller blade 10 and a section of the leading edge 12a of the propeller blade 10 close to the tip 12c may be provided with the soft layer 121 and the intermediate layer 122.

In some embodiments, the length of the soft layer 121 provided at the leading edge 12a of the propeller blade 10 may be one-third to one-half of the length of the leading edge 12a of the propeller blade 10. Since the tip 12c of the propeller blade 10 and the leading edge 12a of the propeller blade 10 are parts that are relatively easy to touch the human body, the soft layer 121 is provided at the tip 12c of the propeller blade 10 and the section of the leading edge 12a of the propeller blade 10 near the tip 12c, to effectively reduce the damage to the human body when the propeller blade 10 hits the human body. The soft layer 121 and the intermediate layer 122 are only provided at the tip 12c of the propeller blade 10 and the section of the leading edge 12a of the propeller blade 10 near the tip 12c, which may reduce the manufacturing difficulty of the propeller blade 10.

In some embodiments, in the thickness direction Z of the propeller blade 10, the intermediate layer 122 includes the hard component 1222 in the middle and the soft component 1221 on both sides of the hard component 1222 as shown in the cross-section along the width direction W of the propeller blade 10. With the intermediate layer 122 provided to include a laminated structure of the soft component 1221 and the hard component 1222, the contact area between the soft component 1221 and the hard component 1222 may be effectively increased, such that the soft component 121 may be relatively firmly connected to the main body 11 and may be not easy to fall off.

The hard component 1222 may be formed by extending the main body 11. In some embodiments, the hard component 1222 may be formed by extending the middle part of the main body 11 in the cross-section shown in FIG. 4. In some other embodiments, the hard component 1222 may be formed not by extending the middle part of the main body 11 but another part of the main body 11 in the cross-section. For example, the hard component 1222 may be formed by extending the upper part of the main body 11 in the cross-section, or formed by extending the lower part of the main body 11 in the cross-section. As another example, the upper and lower parts of the main body 11 in the cross-section may extend to form the hard component having two parts spaced apart from each other. As a further example, the main body 11 in the cross-section can extend entirely to form the hard component flush with the upper and lower surfaces of the main body 11. The manner of forming the hard component 1222 may be determined according to the structure of the intermediate layer 122.

In some embodiments, the hard component 1222 may be integrally formed with the main body 11, that is, the hard component 1222 and the main body 11 may be considered to be one component. Therefore, the overall strength of the hard component 1222 and the main body 11 may be increased while reducing manufacturing difficulty. Further, the hard component 1222 and the main body 11 may be integrally formed from the same material, which is convenient for manufacture. In some other embodiment, the hard component 1222 and the main body 11 may be formed integrally using different materials. For example, an object containing two materials may be machined to form the main body 11 and the hard component 1222. In some other embodiments, the hard component 1222 and the main body 11 may be formed by connecting separate parts.

In some embodiments, the soft component 1221 and the soft layer 121 may be integrally formed from the same material. That is to say, the soft component 1221 and the soft layer 121 may be considered to be one component, and this design method may increase the overall strength of the soft component 1221 and the soft layer 121 while reducing manufacturing difficulty. In some other embodiments, the soft component 1221 and the soft layer 121 may be formed by connecting separate components.

Figure 5:
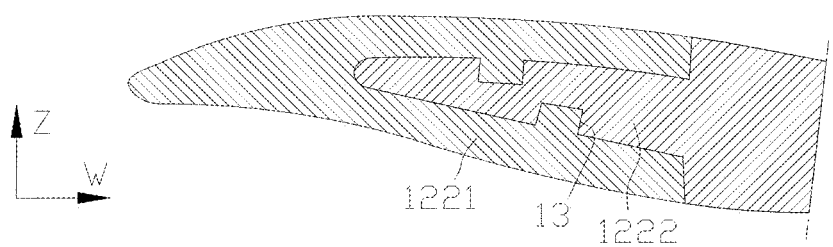
FIG. 5 is a schematic diagram of the propeller blade in FIG. 1 with a groove proved at the hard component.

As shown in FIG. 5, in some embodiments, in the thickness direction Z of the propeller blade 10, the hard component 1222 may be provided with grooves 13. With the grooves 13, the soft component 1221 may be partially embedded in the grooves 13 to increase the bonding strength between the soft component 1221 and the hard component 1222, such that the soft component 1221 and the soft layer 121 are not easy to fall off. Especially, when the propeller blade 10 rotates, the soft component 1221 embedded in the grooves 13 may overcome the centrifugal force of the soft component 1221, to avoid the situation that the soft component 1221 is peeled off from the hard component 1222 when the centrifugal force is too large. The number of the grooves 13 may be one or more, and when the number of the grooves 13 is multiple, the grooves 13 may be arranged at intervals along the leading edge 12a of the propeller blade 10 and the tip 12c of the propeller blade 10.

Figure 6:
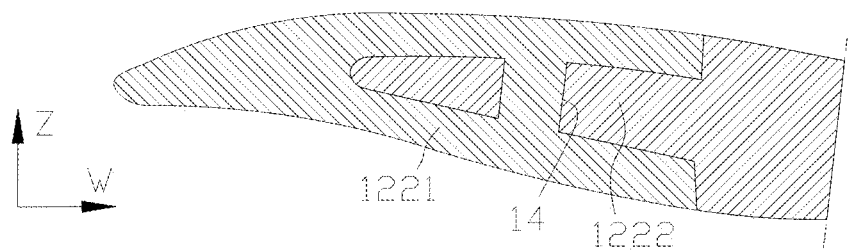
FIG. 6 is a schematic diagram of the propeller blade in FIG. 1 with a through hole provided at the hard component.

The way to increase the bonding strength between the soft component 1221 and the hard component 1222 is not limited to providing the groove 13 at the hard component 1222. For example, as shown in FIG. 6, in the thickness direction Z of the propeller blade 10, through holes 14 are provided at the hard component 1222, and the soft component 1221 is partially embedded in the through holes 14, to increase the bonding strength between the soft component 1221 and the hard component 1222. Especially when the propeller blade 10 rotates, the soft component 1221 embedded in the through holes 14 may overcome the centrifugal force of the soft component 1221, and avoid the situation that the soft component 1221 is peeled off from the hard component 1222 when the centrifugal force is too large. The number of through holes 14 may be one or more. Similarly, when the number of through holes 14 is multiple, the multiple through holes 14 may be arranged at intervals along the leading edge 12a of the propeller blade 10 and the tip 12c of the propeller blade 10.

Figure 7:
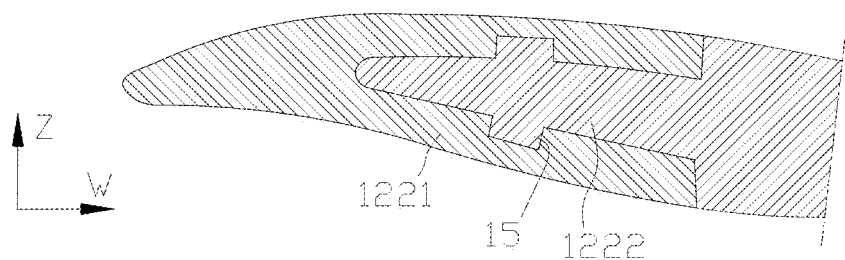
FIG. 7 is a schematic diagram of the propeller blade in FIG. 1 with a protrusion provided at the hard component.

Other ways can also be used to increase the bonding strength between the soft component 1221 and the hard component 1222. For example, as shown in FIG. 7, in the thickness direction Z of the propeller blade 10, protrusions 15 are provided at the hard component 1222. The protrusions 15 and the main body 11 are arranged at intervals. When the soft component 1221 is molded on the hard component 1222, part of the soft component 1221 embedded between the hard component 1222 and the main body 11 may form a buckled structure with the hard component 1222, such that the soft component 1221 and the hard component 1222 are firmly combined. Especially when the propeller blade 10 rotates, the soft component 1221 embedded in the through holes 14 may overcome the centrifugal force of the soft component 1221 because of the blocking effect of the hard component 1222, and avoid the situation that the soft component 1221 is peeled off from the hard component 1222 when the centrifugal force is too large. The number of the protrusions 15 may be one or more. Similarly, when the number of the protrusions 15 is multiple, the multiple protrusions 15 may be arranged at intervals along the leading edge 12a of the propeller blade 10 and the tip 12c of the propeller blade 10. In some embodiments, when one protrusion 15 is provided, the protrusion 15 may be a bar shape and arranged along the leading edge 12a of the propeller blade 10 and the tip 12c of the propeller blade 10.

Figure 8:
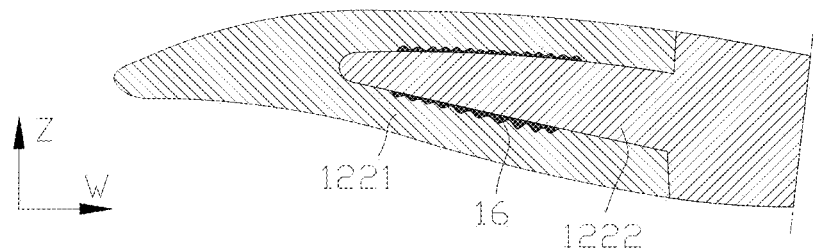
FIG. 8 is a schematic diagram of the propeller blade in FIG. 1 with a coarse layer provided at the hard component.

In another example shown in FIG. 8, in the thickness direction Z of the propeller blade 10, a rough layer 16 is provided at the hard component 1222. The rough layer 16 may increase the contact area between the hard component 1222 and the soft component 1221, to increase the bonding strength between the hard component 1222 and the soft component 1221.

In some embodiments, the soft layer 121 and the main body 11 may be formed by two-color injection molding. That is, the soft layer 121 and the main body 11 may be formed by injection molded on the same two-color injection molding machine. Specifically, the two-color injection molding machine includes one same rear mold and two different front molds. During injection molding, the main body 11 and the hard component 1222 of the propeller blade 10 may be injection-molded with the rear mold and one of the front molds to complete the injection molding process. After the main body 11 and the hard component 1222 are formed, the mold may be opened, and then the rear mold may be rotated 180° such that another set of front mold is closed. Then the soft layer 121 and the soft component 1221 of the propeller blade 10 may be injection-molded. The cycle may repeat like this, to perform the injection molding of the propeller blade 10 continuously. The soft layer 121 and the main body 11 formed by two-color injection molding, may have high production efficiency, and effectively avoid surface quality problems such as flaking, strain or breakage in the formed propeller blade 10. The product has a high yield rate and a good appearance.

In some other embodiments, the soft layer 121 may also be formed at the main body 11 by two-shot injection molding. That is, the soft layer 121 and the main body 11 may be injection-molded on different injection molding machines. For example, the main body 11 and the hard component 1222 may be injection-molded on the mold of one of the injection molding machines to complete the main body 11 and the hard component 1222. Subsequently, the product may be taken out and put into another one of the injection molding machines for injection molding the soft layer 121 and the soft component 1221. Two-shot injection molding has lower requirements on mold design and has the advantage of low cost in small batch production.

In some other embodiments, the soft layer 121 may also be fixed to the main body 11 by sticking. For example, glue may be applied on the surface of the hard component 1222 and/or the soft component 1221 to adhere the soft component 1221 to the hard component 1222. It should be noted that, in this embodiment, the hard component 1222 may have two configuration methods. In one method, the hard component 1222 may be formed by extending the middle of the main body 11. The thickness of the hard component 1222 may be smaller than the thickness of the main body 11, and the outer surface of the hard component 1222 and the outer surface of the main body 11 may be not flush.

In another method, at the joint between the hard component 1222 and the main body 11, the hard component 1222 may formed by directly extending the main body 11, and the outer surface of the hard component 1222 may be flush with the outer surface of the main body 11. This may be considered as directly affixing the soft layer 121 and the soft component 1221 to another blade, such that that the resulting blade is less harmful to the human body. The cost for this manner is low.

In some embodiments, the main body 11 may be made of a material including at least one of metal, carbon fiber, wood, plastic, or glass fiber. Metal, carbon fiber, wood, plastic, and glass fiber materials have good strength and good mechanical properties.

In some embodiments, the soft layer 121 may be made of a material including at least one of foam, foam cotton, rubber, or silica gel. Foam, foam cotton, rubber, and silica gel materials have good elasticity, and when the blade 10 hits the human body, they may form a better buffer and effectively reduce the damage caused by the blade 10 to the human body.

In some embodiments, at the joint between the intermediate layer 122 and the main body 11, the outer surface of the intermediate layer 122 may be flush with the outer surface of the main body 11. Since the outer surface of the intermediate layer 122 is flush with the outer surface of the main body 11, the overall appearance of the formed blade may have good consistency; and there may be no protruding part on the outer surface of the intermediate layer 122 or the outer surface of the main body 11, which will not interfere with the airflow flowing through the surface of the propeller blade 10 and will not reduce the power effect of blade 10.

Figure 3:
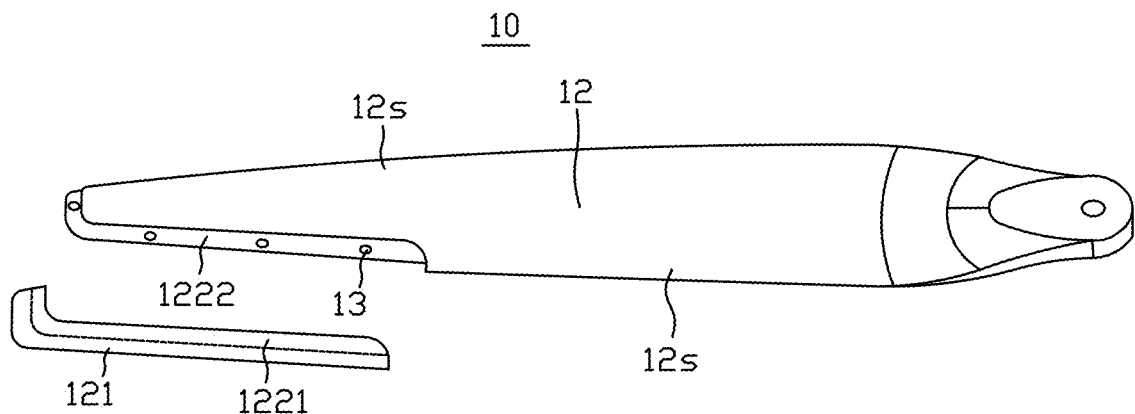
FIG. 3 is an exploded view of the structure in FIG. 1.
Figure 4:
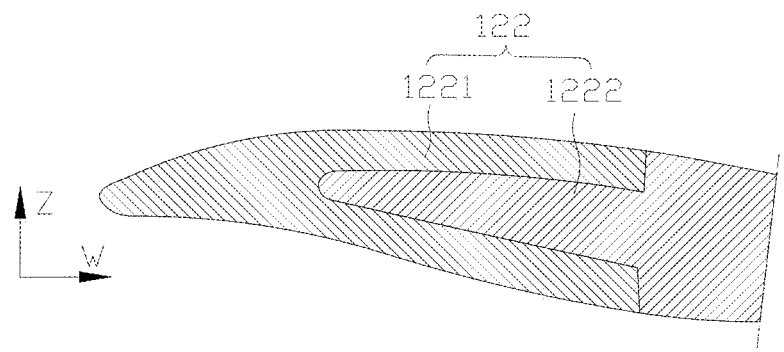
FIG. 4 is a partial enlarged view of the structure in FIG. 2.

As shown in FIG. 3, in some embodiments, the other parts 12s of the edge 12 may be integrally formed with the main body 11. Further, the other parts 12s of the edge 12 and the main body part 11 may be integrally formed from the same material. In some other embodiments, the other parts 12s of the edge 12 and the main body part 11 may be integrally formed from different materials. For example, an object containing two materials may be machined to form the main body 11 and the other part 12s of the edge 12. The other parts 12s of the edge 12 may be considered as being formed by directly extending the main body 11. This method may increase the overall strength of the main body 11 and other parts 12s of the edge 12 while reducing manufacturing difficulty. In some other embodiments, the other part 12s of the edge and the main part 11 may be formed by connecting separate components.

Figure 9:
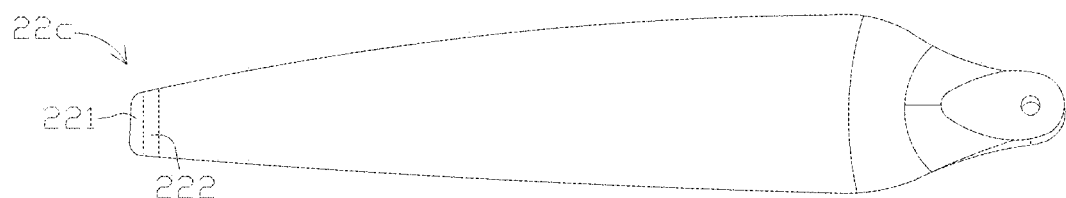
FIG. 9 is a schematic diagram of another exemplary propeller blade provided by another embodiment of the present disclosure.

The embodiments where the soft layer 121 and the intermediate layer 122 are only provided at the tip 12c of the propeller blade 10 and a section of the leading edge 12a of the propeller blade 10 close to the tip 12c are used as examples only to illustrate the present disclosure, and do not limit the scope of the present disclosure. In some other embodiments, as shown in FIG. 9, the soft layer 221 and the intermediate layer 222 are provided only at the tip 22c of the propeller blade 20. The tip 22c of the blade 20 is a position that is relatively easy to contact the human body. With the soft layer 221 and the intermediate layer 222 provided at the tip 22c of the blade 20, the damage to the human body caused by the blade 20 when hitting the human body may be effectively reduced.

Figure 10:
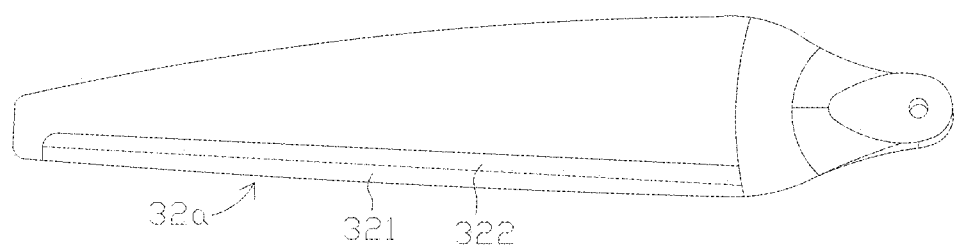
FIG. 10 is a schematic diagram of another exemplary propeller blade provided by another embodiment of the present disclosure.

In some other embodiments, as shown in FIG. 10, the soft layer 321 and the intermediate layer 322 are provided only at the leading edge 32a of the propeller blade 30. The leading edge 32a of the blade 30 is also a position that is relatively easy to contact the human body. With the soft layer 321 and the intermediate layer 322 provided at the leading edge 32a of the blade 30, the damage to the human body caused by the blade 30 when hitting the human body may be effectively reduced.

Figure 11:
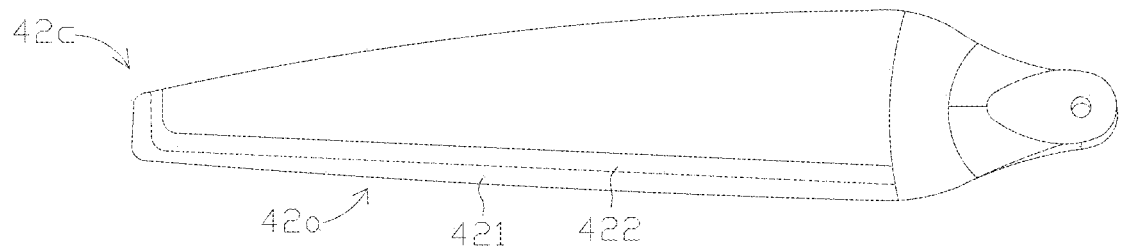
FIG. 11 is a schematic diagram of another exemplary propeller blade provided by another embodiment of the present disclosure.

In some other embodiments, as shown in FIG. 11, the soft layer 421 and the intermediate layer 422 are provided at the tip 42c and the leading edge 42a of the propeller blade 40. With the soft layer 421 and the intermediate layer 422 provided at the tip 42c and the leading edge 42a of the propeller blade 40, the damage to the human body caused by the blade 30 when hitting the human body may be effectively reduced.

Figure 12:
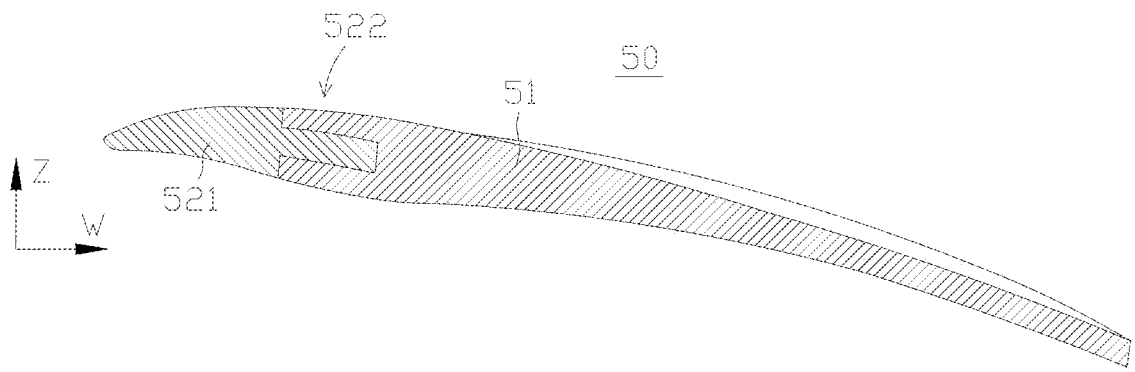
FIG. 12 is a schematic diagram of another exemplary propeller blade provided by another embodiment of the present disclosure.
Figure 13:
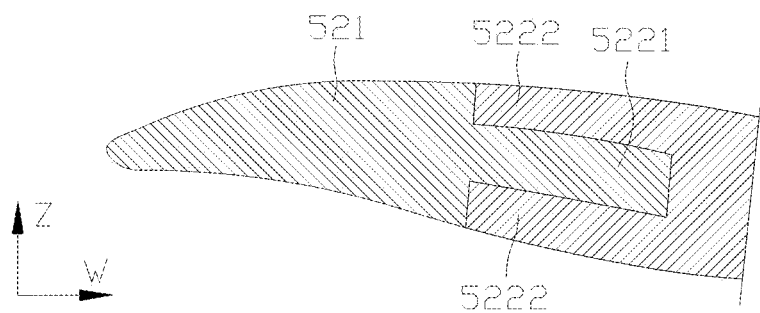
FIG. 13 is a partial enlarged view of the structure in FIG. 12.

In the thickness direction Z of the propeller blade 10, the section of the intermediate layer 122 along the width direction W of the propeller blade 10 is not limited to the configuration where the soft component 1221 is located on two sides of the hard component 1222. In some other embodiments, as shown in FIGS. 12 and 13, in the thickness direction Z of the propeller blade 50, the section of the intermediate layer 522 along the width direction W of the propeller blade 50 may include a soft component 5221 in the middle and a hard component 5222 on two sides of the soft component 5221. This configuration may also effectively increase the contact area between the soft component 5221 and the hard component 5222, such that the soft layer 521 may be relatively firmly connected to the main body part 51 and may not be easy to fall off.

Figure 14:
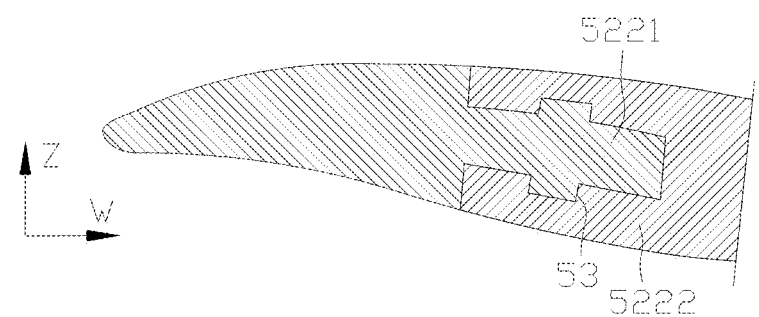
FIG. 14 is a schematic diagram of the propeller blade in FIG. 12 with a groove provided at the hard component.

As shown in FIG. 14, in some embodiments, in the thickness direction Z of the propeller blade 50, opposite surfaces of the hard component 5222 may be provided with grooves 53. With the grooves 53, the soft component 5221 may be partially embedded in the grooves 53 to increase the bonding strength between the soft component 5221 and the hard component 5222, such that the soft component 5221 and the soft layer 521 are not easy to fall off. Especially, when the propeller blade 50 rotates, the soft component 5221 embedded in the grooves 53 may overcome the centrifugal force of the soft component 5221, to avoid the situation that the soft component 5221 is peeled off from the hard component 5222 when the centrifugal force is too large. The number of the grooves 53 may be one or more, and when the number of the grooves 53 is multiple, the grooves 53 may be arranged at intervals along the leading edge 52a of the propeller blade 50 and the tip 52c of the propeller blade 50.

Figure 15:
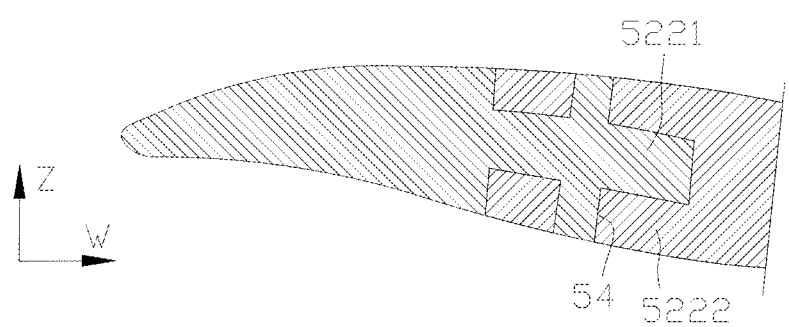
FIG. 15 is a schematic diagram of the propeller blade in FIG. 12 with a through hole provided at the hard component.

The way to increase the bonding strength between the soft component 5221 and the hard component 5222 is not limited to providing the groove 53 at the hard component 5222. For example, as shown in FIG. 15, in the thickness direction Z of the propeller blade 50, through holes 54 are provided at the hard component 5222, and the soft component 5221 is partially embedded in the through holes 54, to increase the bonding strength between the soft component 5221 and the hard component 5222. Especially when the propeller blade 50 rotates, the soft component 5221 embedded in the through holes 54 may overcome the centrifugal force of the soft component 5221, and avoid the situation that the soft component 5221 is peeled off from the hard component 5222 when the centrifugal force is too large. The number of through holes 54 may be one or more. Similarly, when the number of through holes 54 is multiple, the multiple through holes 54 may be arranged at intervals along the leading edge 52a of the propeller blade 50 and the tip 52c of the propeller blade 50.

Figure 16:
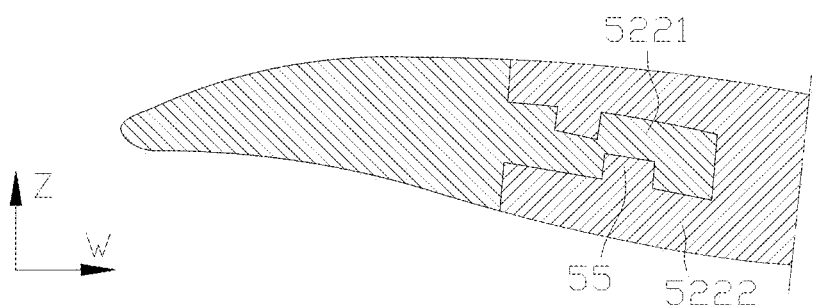
FIG. 16 is a schematic diagram of the propeller blade in FIG. 12 with a protrusion provided at the hard component.

Other ways can also be used to increase the bonding strength between the soft component 5221 and the hard component 5222. In another embodiment shown in FIG. 16, for example, in the thickness direction Z of the propeller blade 50, protrusions 55 are provided at the opposite surfaces of the hard component 5222. When the soft component 5221 is molded on the hard component 5222, part of the soft component 5221 embedded between the hard component 5222 and the main body 51 may form a buckled structure with the hard component 5222, such that the soft component 5221 and the hard component 5222 are firmly combined. Especially when the propeller blade 50 rotates, the soft component 5221 embedded between the hard component 5222 and the main body 51 may overcome the centrifugal force of the soft component 5221 because of the blocking effect of the hard component 5222, and avoid the situation that the soft component 5221 is peeled off from the hard component 5222 when the centrifugal force is too large. The number of the protrusions 55 may be one or more. Similarly, when the number of the protrusions 55 is multiple, the multiple protrusions 55 may be arranged at intervals along the leading edge 52a of the propeller blade 50 and the tip 52c of the propeller blade 50. In some embodiments, when one protrusion 55 is provided, the protrusion 55 may have a bar shape and arranged along the leading edge 52a of the propeller blade 50 and the tip 52c of the propeller blade 50.

Figure 17:
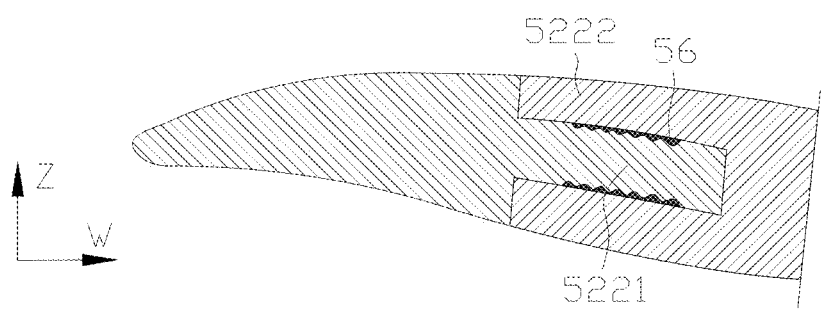
FIG. 17 is a schematic diagram of the propeller blade in FIG. 12 with a coarse layer provided at the hard component.

In another embodiment shown in FIG. 17, in the thickness direction Z of the propeller blade 50, a rough layer 56 is provided at the opposite surfaces of the hard component 1222. The rough layer 56 may increase the contact area between the hard component 5222 and the soft component 5221, to increase the bonding strength between the hard component 5222 and the soft component 5221.

Figure 18:
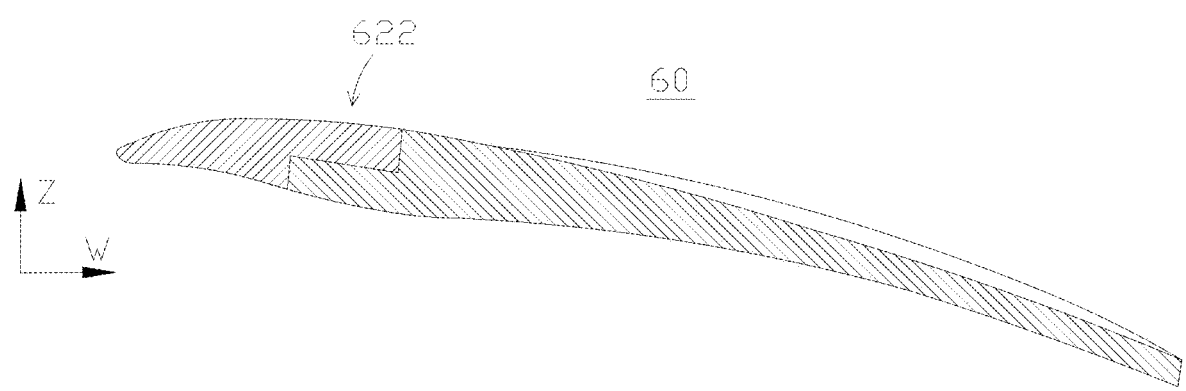
FIG. 18 is a schematic diagram of another exemplary propeller blade provided by another embodiment of the present disclosure.
Figure 19:
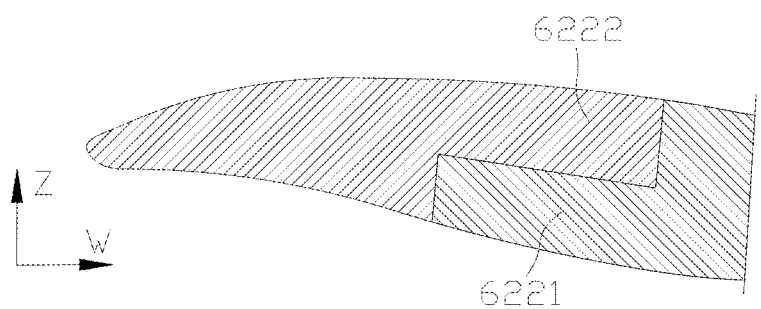
FIG. 19 is a partial enlarged view of the structure in FIG. 18.

In some other embodiments shown in FIG. 18 and FIG. 19, in the thickness direction Z of the propeller blade 60, the section of the intermediate layer 622 along the width direction W of the propeller blade 60 may include a soft components 6222 and a hard component 6221 stacked in layers.

Figure 20:
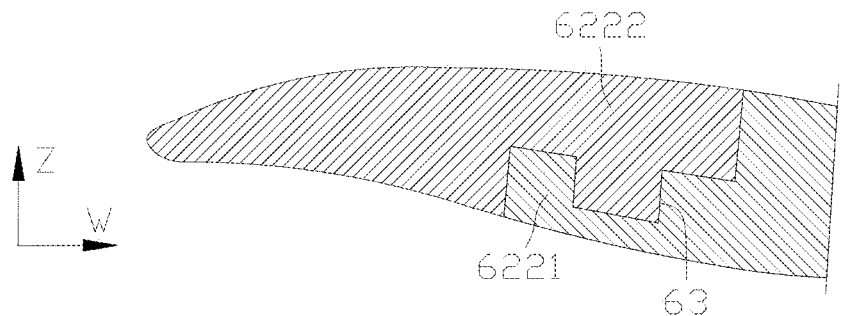
FIG. 20 is a schematic diagram of the propeller blade in FIG. 18 with a groove provided at the hard component.

As shown in FIG. 20, in some embodiments, in the thickness direction Z of the propeller blade 60, a surface of the hard component 6221 facing the soft component 6222 may be provided with a groove 63. With the groove 63, the soft component 6222 may be partially embedded in the groove 63 to increase the bonding strength between the soft component 6222 and the hard component 6221, such that the soft component 6222 and the soft layer 621 are not easy to fall off.

Figure 21:
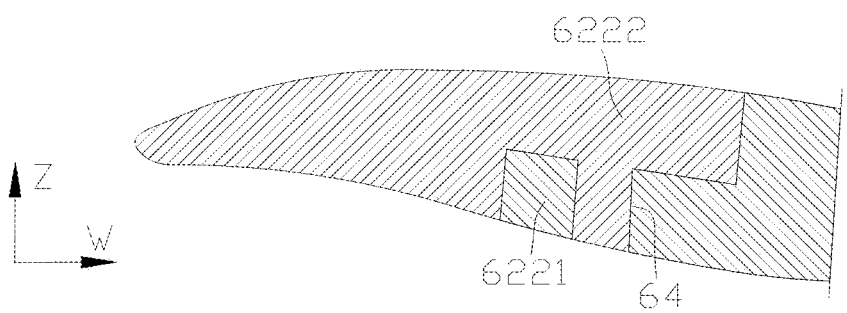
FIG. 21 is a schematic diagram of the propeller blade in FIG. 18 with a through hole provided at the hard component.

The way to increase the bonding strength between the soft component 6222 and the hard component 6221 is not limited to providing the groove 63 at the hard component 6221. For example, in another embodiment shown in FIG. 21, in the thickness direction Z of the propeller blade 60, a through hole 64 is provided at the hard component 6221, and the soft component 6222 is partially embedded in the through hole 64, to increase the bonding strength between the soft component 6222 and the hard component 6221.

Figure 22:
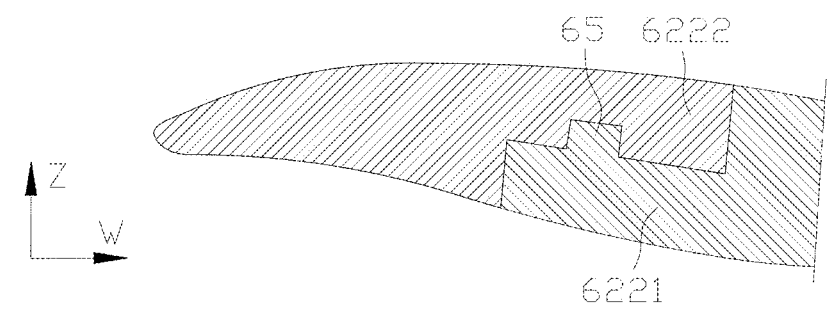
FIG. 22 is a schematic diagram of the propeller blade in FIG. 18 with a protrusion provided at the hard component.

Other ways can also be used to increase the bonding strength between the soft component 6222 and the hard component 6221. In another embodiment shown in FIG. 22, for example, in the thickness direction Z of the propeller blade 60, a protrusion 66 is provided at the surface of the hard component 6221 facing the soft component 6222. When the soft component 6222 is molded on the hard component 6221, part of the soft component 6222 embedded between the hard component 6221 and the main body 61 may form a buckled structure with the hard component 6221, such that the soft component 6222 and the hard component 6221 are firmly combined.

Figure 23:
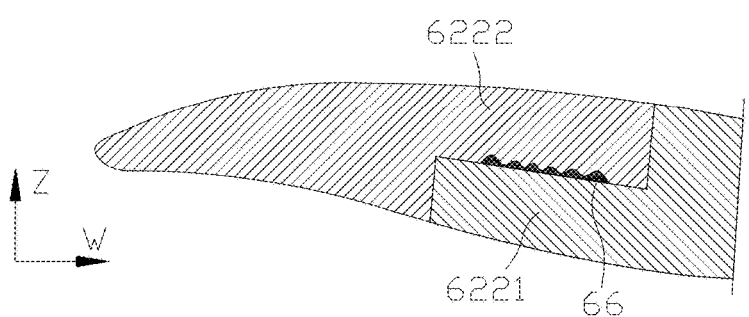
FIG. 23 is a schematic diagram of the propeller blade in FIG. 18 with a coarse layer provided at the hard component.

In another embodiment shown in FIG. 23, in the thickness direction Z of the propeller blade 60, a rough layer 66 is provided at the surface of the hard component 6221 facing the soft component 6222. The rough layer 66 may increase the contact area between the hard component 6221 and the soft component 6222, to increase the bonding strength between the hard component 6221 and the soft component 6222.

Figure 24:
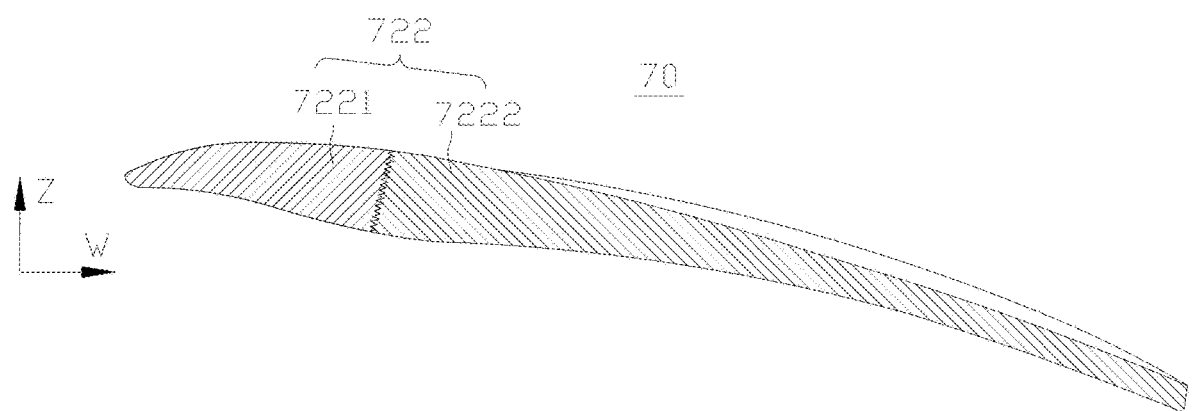
FIG. 24 is a schematic diagram of another exemplary propeller blade provided by another embodiment of the present disclosure.

In some other embodiment shown in FIG. 24, when viewing from the cross-section of the intermediate layer 722 in the width direction, the soft component 7221 and the hard component 7222 have a serrated boundary in the thickness direction Z of the propeller blade 70. The serrated boundary between the soft component 7221 and the hard component 7222 increases the contact area between the hard component 7222 and the soft component 7221, and hence increases the bonding strength between the hard component 7222 and the soft component 7221.

Figure 25:
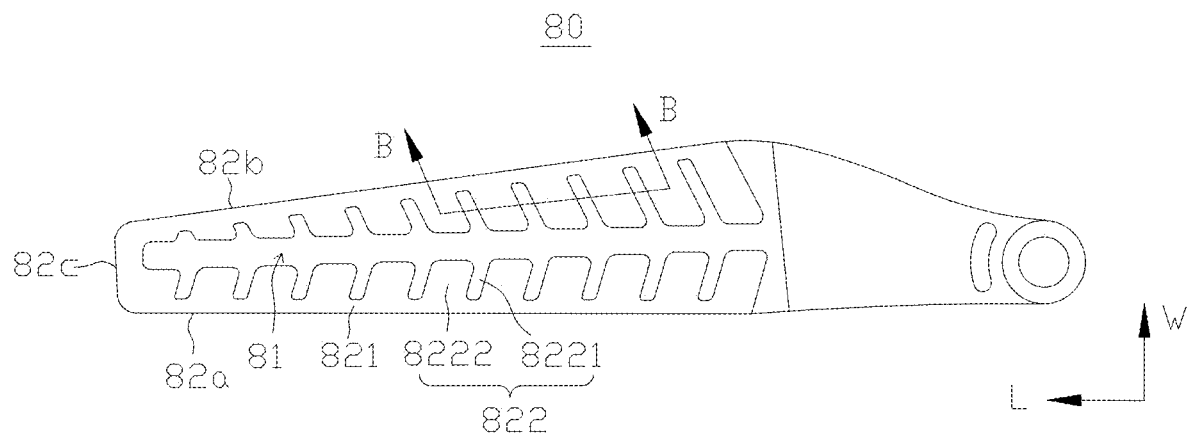
FIG. 25 is a schematic diagram of another exemplary propeller blade provided by another embodiment of the present disclosure.
Figure 26:
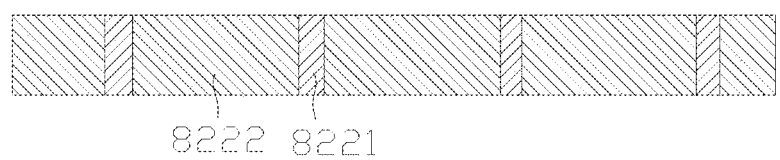
FIG. 26 is a cross-sectional view along B-B in FIG. 25.
Figure 27:
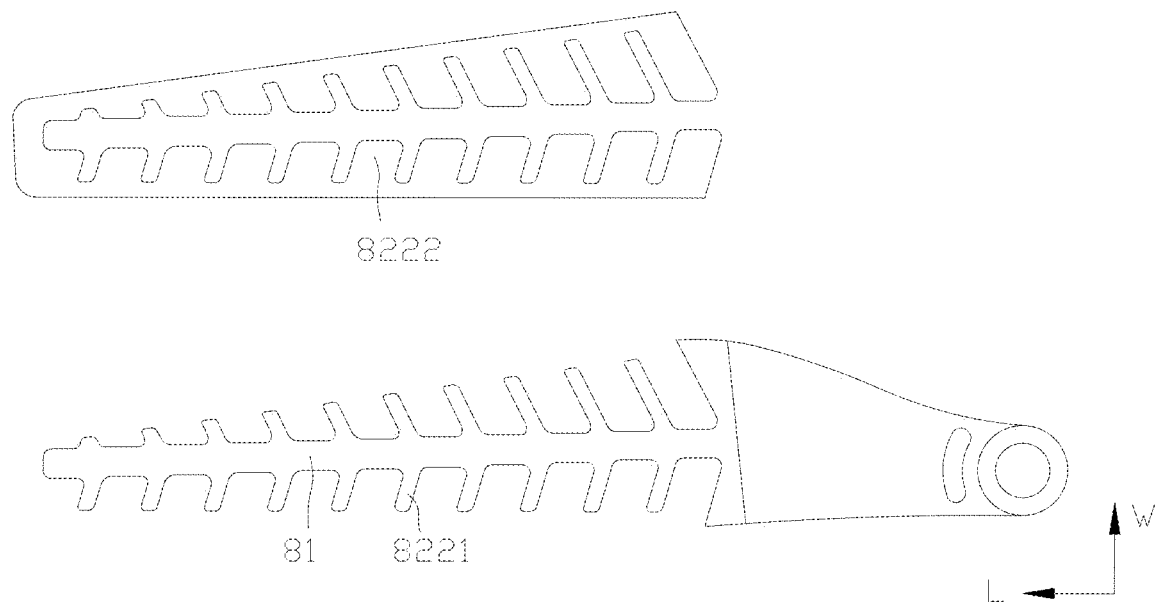
FIG. 27 is an exploded view of the structure in FIG. 25.

In some other embodiments shown in FIG. 25 to FIG. 27, the leading edge 82a of the propeller blade 80, the trailing edge 82b of the propeller blade 80 and the tip 82c of the propeller blade 80 are provided with a soft layer 821 and an intermediate layer 822. In this embodiment, by disposing the soft layer 821 on all edges of the blade 80, the damage to the human body caused by the blade 80 hitting the human body may be minimized.

In this embodiment, as viewing from the cross-section along the length direction L of the propeller blade 80, the intermediate layer 822 includes a plurality of hard components 8221 and a plurality of soft components 8222, and the plurality of hard components 8221 and the plurality of soft components 8222 are arranged staggeredly along the length direction L of the main body 81.

For example, the plurality of hard components 8221 may be arranged on both sides of the main body 81 and may be arranged at an angle with the main body 81. Hard components 8221 of the plurality of hard components 8221 on a same side of the main body 81 may be arranged at intervals along the extending direction of the main body 81. The plurality of soft components 8222 may be embedded between any two adjacent hard components 8221 of the plurality of hard components 8221.

Figure 28:
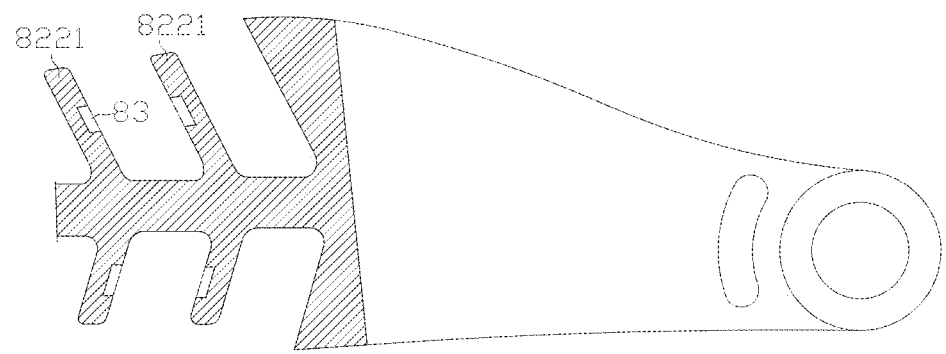
FIG. 28 is a schematic diagram of the propeller blade in FIG. 25 with a groove provided at the hard component.

As shown in FIG. 28, in some embodiments, in the thickness direction Z of the propeller blade 80, surfaces of two adjacent hard components 8221 facing each other may be provided with grooves 83. With the grooves 83, the plurality of soft components 8222 may be partially embedded in the grooves 83 to increase the bonding strength between the plurality of soft components 8222 and the plurality of hard components 8221, such that the plurality of soft components 8222 and the soft layer 821 are not easy to fall off.

Figure 29:
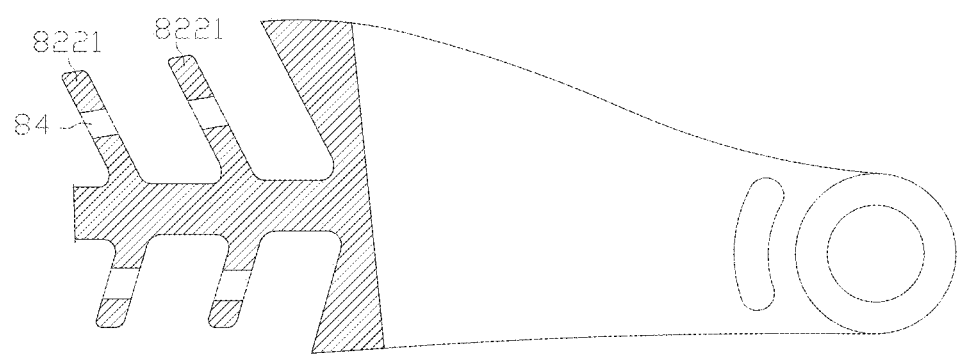
FIG. 29 is a schematic diagram of the propeller blade in FIG. 25 with a through hole provided at the hard component.

The way to increase the bonding strength between the plurality of soft components 8222 and the plurality of hard components 8221 is not limited to providing the grooves 83 at the plurality of hard components 8221. For example, in another embodiment shown in FIG. 29, in the thickness direction Z of the propeller blade 80, through holes 84 are provided at the surfaces of two adjacent hard components 8221 facing each other, and the plurality of soft components 8222 is partially embedded in the through holes 84, to increase the bonding strength between the plurality of soft components 8222 and the plurality of hard components 8221.

Figure 30:
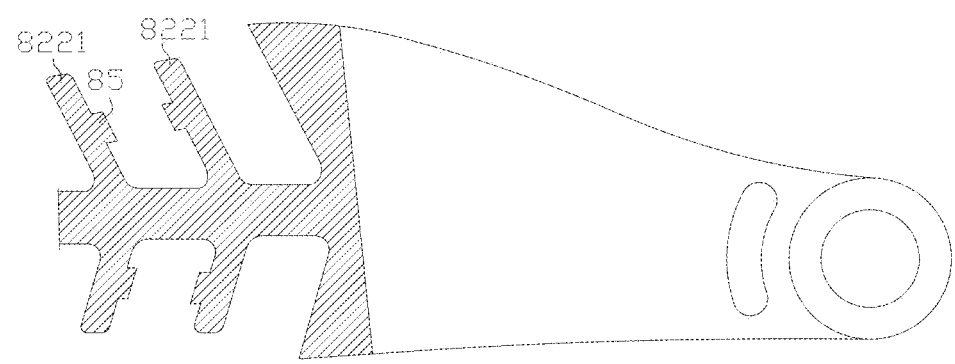
FIG. 30 is a schematic diagram of the propeller blade in FIG. 25 with a protrusion provided at the hard component.
Figure 31:
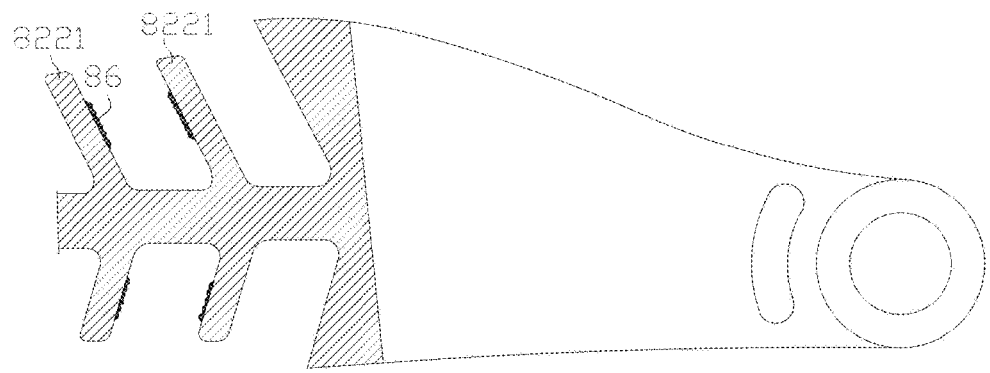
FIG. 31 is a schematic diagram of the propeller blade in FIG. 25 with a coarse layer provided at the hard component.

Other ways can also be used to increase the bonding strength between the plurality of soft components 8222 and the plurality of hard components 8221. In another embodiment shown in FIG. 30, for example, in the thickness direction Z of the propeller blade 80, protrusions 85 are provided at the surfaces of two adjacent hard components 8221 facing each other. When the plurality of soft components 8222 is molded on the plurality of hard components 8221, part of the plurality of soft components 8222 may form a buckled structure with the hard component 8221, such that the plurality of soft components 8222 and the plurality of hard components 8221 are firmly combined.

In another embodiment shown in FIG. 23, in the thickness direction Z of the propeller blade 80, rough layers 86 are provided at the surfaces of two adjacent hard components 8221 facing each other. The rough layers 88 may increase the contact area between the plurality of hard components 8221 and the plurality of soft components 8222, to increase the bonding strength between the plurality of hard components 8221 and the plurality of soft components 8222.

Figure 32:
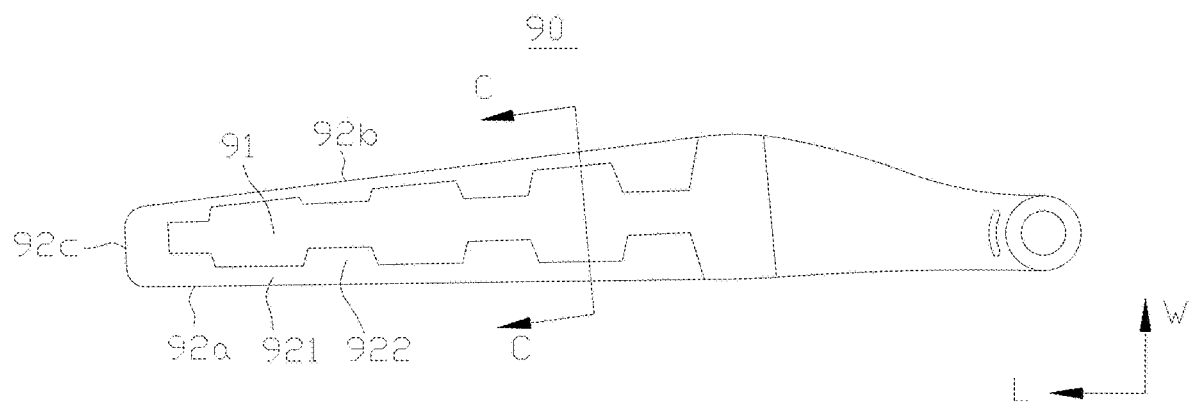
FIG. 32 is a schematic diagram of another exemplary propeller blade provided by another embodiment of the present disclosure.
Figure 33:
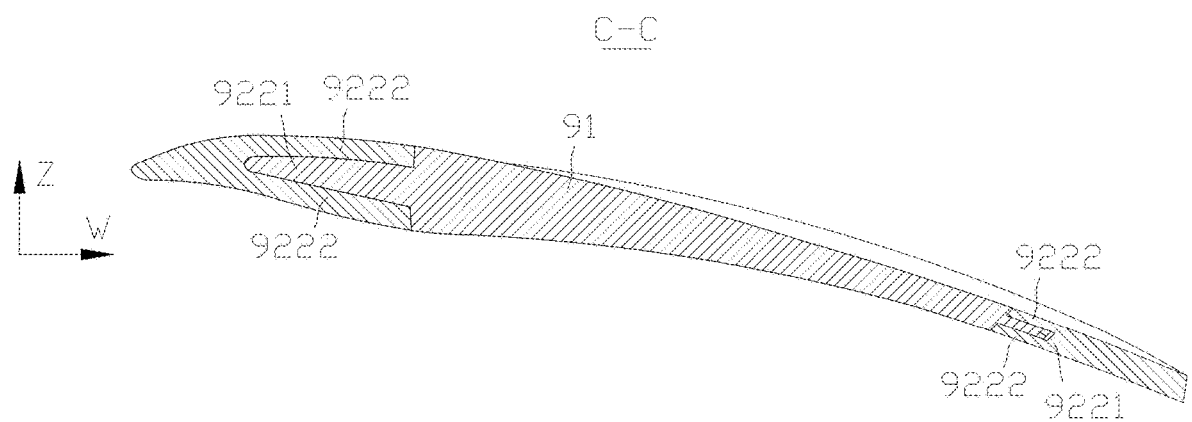
FIG. 33 is a cross-sectional view along C-C in FIG. 32.
Figure 34:
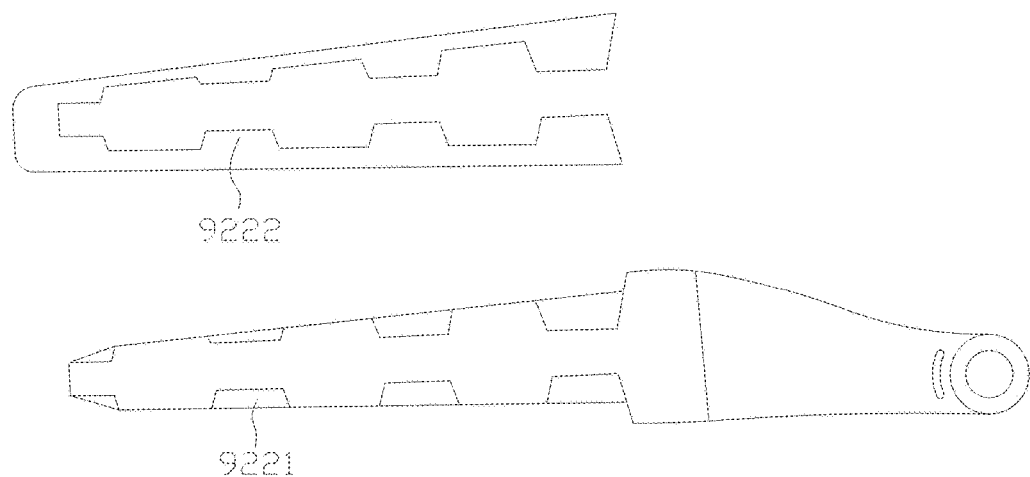
FIG. 34 is an exploded view of the structure in FIG. 32.

The intermediate layer 822 is not limited to a structure in which as viewing from the cross-section along the length direction L of the propeller blade 80 the intermediate layer 822 includes the plurality of hard components 8221 and the plurality of soft components 8222 arranged staggeredly along the length direction L of the propeller blade 80. In some other embodiments, as shown in FIG. 32 to FIG. 34, in the thickness direction Z of the propeller blade 90, as viewing from the cross-section along the length direction L of the propeller blade 90, the intermediate layer 922 includes hard components 9221 in the middle and soft components 9222 at two sides of the hard components 9221. With the soft components 9222 and the hard components 9221 of the intermediate layer 922 provided in a stacked structure, the contact area between the soft components 9222 and the hard components 9221 may be effectively increased, such that the soft layer 922 may be more firmly connected to the main body 91 and may not be easy to fall off.

In this embodiment, the number of the hard components 9221 may be multiple, and the multiple hard components 9221 may be arranged at intervals along the leading edge 92a of the propeller blade 90, the tip 92b of the propeller blade 90, and the trailing edge 92c of the propeller blade 90.

In some other embodiment, there may be only one hard component 9221, and the hard component 9221 may be disposed along the leading edge 92a of the propeller blade 90, the tip 92b of the propeller blade 90, and the trailing edge 92c of the propeller blade 90.

Figure 35:
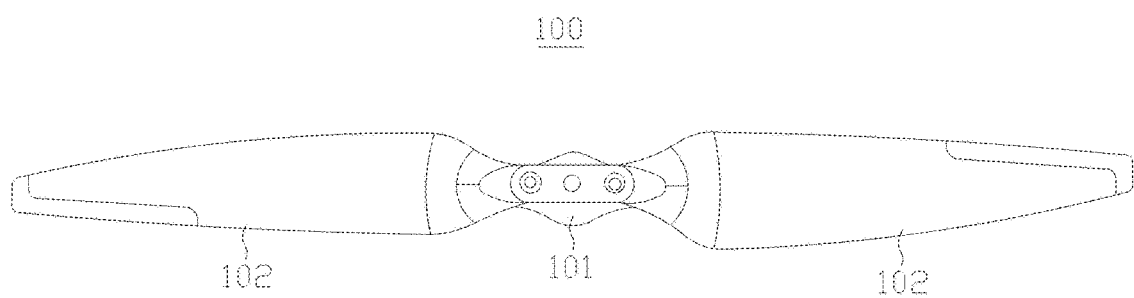
FIG. 35 is a schematic diagram of a propeller consistent with the present disclosure.

The present disclosure also provides a propeller 100. As shown in FIG. 35, the propeller 100 includes a propeller hub 101 (a propeller hub is also simply referred to as a "hub") and at least two propeller blades 102 installed at the propeller hub 101. The at least two propeller blades 102 may adopt any blades provided by the above-mentioned embodiments. Since the propeller 100 adopts any blades provided by the above-mentioned embodiments, when the propeller blades hit the human body, the soft layer may form a cushioning effect, effectively reducing the damage to the human body. Moreover, the contact area between the soft part and the hard part may be increased, to increase bonding strength between the soft part and the hard part, such that the soft layer is not easy to fall off from the main body.

Figure 36:
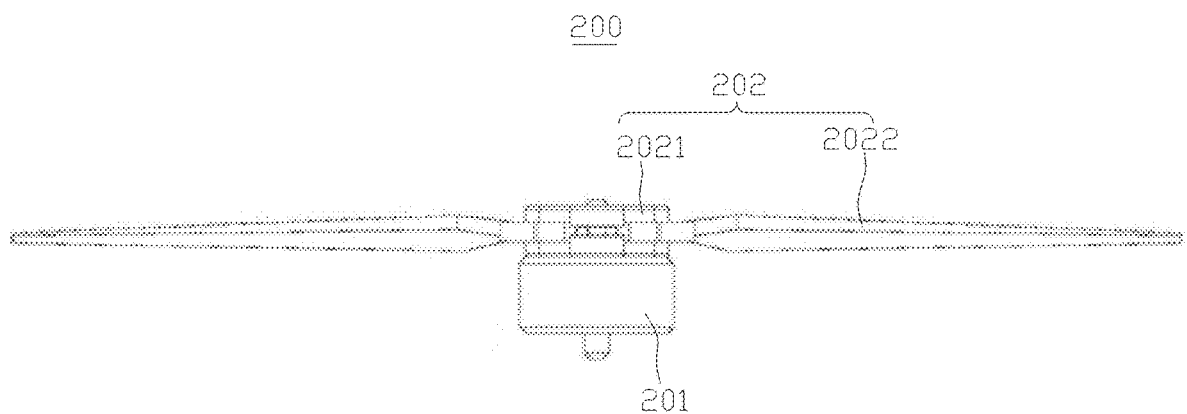
FIG. 36 is a schematic diagram of a power assembly consistent with the present disclosure.

The present disclosure also provides a power assembly 200. As shown in FIG. 36, the power assembly 200 includes a driver 201 and a propeller 202, and the propeller 202 includes a propeller hub 2021 and at least two propeller blades 2022 mounted at the propeller hub 2021. The propeller 202 is installed at the driver 201 through the propeller hub 2021. The at least two propeller blades 202 may adopt any blades provided by the above-mentioned embodiments. Since the propeller 200 adopts any blades provided by the above-mentioned embodiments, when the propeller blades hit the human body, the soft layer may form a cushioning effect, effectively reducing the damage to the human body. Moreover, the contact area between the soft part and the hard part may be increased, to increase bonding strength between the soft part and the hard part, such that the soft layer is not easy to fall off from the main body.

Figure 37:
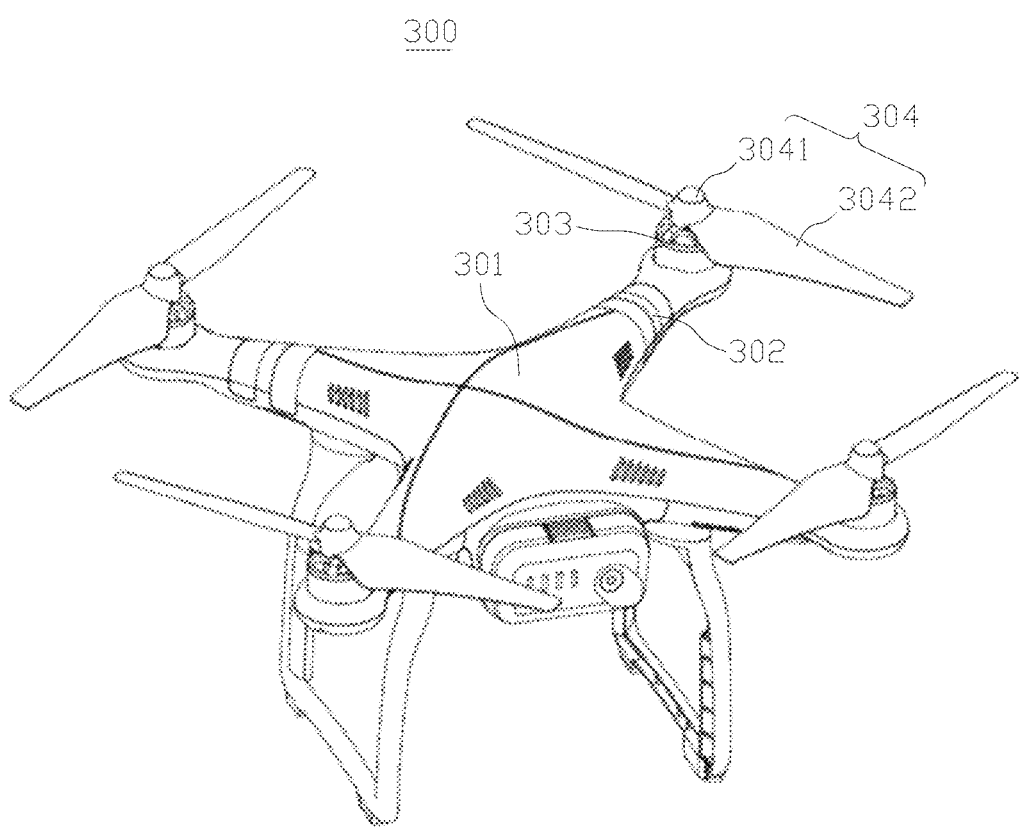
FIG. 37 is a schematic diagram of a multi-rotor unmanned aerial vehicle consistent with the present disclosure.

The present disclosure also provides a multi-rotor unmanned aerial vehicle 300. As shown in FIG. 37, the multi-rotor unmanned aerial vehicle 300 includes a body 301, arms 302, drivers 303, and propellers 304. The arms 302 are mechanically coupled with the body 301, and the drivers 303 are installed at the arms 302. Each propeller 304 includes a propeller hub 3041 and at least two propeller blades 3042 installed at the propeller hub 3041, and is installed at one corresponding driver 303 through the propeller hub 3041. The at least two propeller blades 3042 may adopt any blades provided by the above-mentioned embodiments. Since the multi-rotor unmanned aerial vehicle 300 adopts any blades provided by the above-mentioned embodiments, when the propeller blades hit the human body, the soft layer may form a cushioning effect, effectively reducing the damage to the human body. Moreover, the contact area between the soft part and the hard part may be increased, to increase bonding strength between the soft part and the hard part, such that the soft layer is not easy to fall off from the main body.

The blade provided by various embodiments of the present disclosure is not limited to being applied to multi-rotor unmanned aerial vehicles, but may also be used on fixed-wing unmanned aerial vehicles. When the blade provided by various embodiments of the present disclosure is used on a fixed-wing unmanned aerial vehicle, a root of the blade may be directly connected to the vehicle body of the fixed-wing unmanned aerial vehicle, and the blade is used as a wing.

Further, the blade provided by various embodiments of the present disclosure is also not limited to being applied to unmanned aerial vehicles, but may also be used on any other aerial vehicles or vehicles that a blade is needed. The application of the blade to unmanned aerial vehicles as described above is merely an example.

The above are only specific implementations of embodiments of the present disclosure, but the scope of the present disclosure is not limited to this. One of ordinary skill in the art can easily think of various equivalents within the technical scope disclosed in the present disclosure. These modifications or replacements shall be included within the scope of the present disclosure. Therefore, the protection scope of the present invention shall be subject to the scope of the claims.

What is claimed is:

1. A blade comprising:
a main body; and
an edge disposed around a periphery of the main body, a part of the edge including:
a soft layer; and
an intermediate layer connected between the soft layer and the main body, the intermediate layer including a soft component and a hard component stacked one on another when viewing in a cross-section along a width direction of the blade or along a length direction of the blade;
wherein:
the soft component includes two first parts arranged on two sides of the hard component in a thickness direction of the blade, each of the two first parts of the soft component is provided with a first member in contact with the hard component, the first member includes at least one of a groove, a through hole, a protrusion, or a rough layer, and a first contact surface between the soft component and the hard component is closer to the main body than a first edge of the first member in the width direction, the first contact surface being a contact surface between the soft component and the hard component that is closest to the main body in the width direction, and the first edge of the first member being an edge of the first member that is closest to the main body in the width direction; or
the hard component includes two second parts arranged on two sides of the soft component in the thickness direction, each of the two second parts of the hard component is provided with a second member in contact with the soft component, the second member includes at least one of a groove, a through hole, a protrusion, or a rough layer, and a second contact surface between the soft component and the hard component is closer to the main body than a second edge of the second member in the width direction, the second contact surface being a contact surface between the soft component and the hard component that is closest to the main body in the width direction, and the second edge of the second member being an edge of the second member that is closest to the main body in the width direction.

2. The blade according to claim 1, wherein:
the part of the edge is a first edge part; and
the edge further includes a second edge part integrally formed with the main body.

3. The blade according to claim 1, wherein:
the edge includes a leading edge of the blade, a trailing edge of the blade, and a tip of the blade; and
the soft layer and the intermediate layer are provided at the tip and/or the leading edge.

4. The blade according to claim 3, wherein the soft layer and the intermediate layer are provided at the tip and a section of the leading edge near the tip.

5. The blade according to claim 1, wherein the soft component and the hard component are stacked one on another in the thickness direction of the blade.

6. The blade according to claim 1, wherein the soft component and the hard component are arranged side by side in the width direction of the blade, and a boundary between soft component and the hard component is serrated.

7. The blade according to claim 1, wherein:
the edge includes a leading edge of the blade, a trailing edge of the blade, and a tip of the blade; and
the soft layer and the intermediate layer are provided at the leading edge, the trailing edge, and the tip.

8. The blade according to claim 7, wherein:
the soft component is one of a plurality of soft components of the intermediate layer, and the hard component is one of a plurality of hard components of the intermediate layer; and
the plurality of soft components and the plurality of hard components are arranged alternately along the length direction of the blade.

9. The blade according to claim 8, wherein surfaces of two adjacent ones of the plurality of hard components facing each other are provided with at least one of grooves, through holes, protrusions, or rough layers.

10. The blade according to claim 7, wherein the hard component is one of a plurality of hard components of the intermediate layer that are disposed at intervals along the leading edge, the tip, and the trailing edge.

11. The blade according to claim 1, wherein the soft layer is formed at the main body by two-shot injection molding.

12. The blade according to claim 1, wherein:
the soft component includes the two first parts arranged on the two sides of the hard component in the thickness direction of the blade, each of the two first parts of the soft component is provided with the first member in contact with the hard component, and the first member includes the through hole.

13. The blade according to claim 1, wherein:
the hard component includes the two second parts arranged on the two sides of the soft component in the thickness direction of the blade, each of the two second parts of the hard component is provided with a second member in contact with the soft component, and the second member includes the through hole.

14. The blade according to claim 1, wherein:
the soft component includes the two first parts arranged on the two sides of the hard component in the thickness direction of the blade, each of the two first parts of the soft component is provided with the first member in contact with the hard component, the first member includes the groove, and projections of the two grooves along the thickness direction do not overlap with each other.

15. The blade according to claim 1, wherein:
the hard component includes the two second parts arranged on the two sides of the soft component in the thickness direction of the blade, each of the two second parts of the hard component is provided with the second member in contact with the soft component, the second member includes the groove, and projections of the two grooves along the thickness direction do not overlap with each other.

16. The blade according to claim 1, wherein:
the soft component includes the two first parts arranged on the two sides of the hard component in the thickness direction of the blade, each of the two first parts of the soft component is provided with the first member in contact with the hard component, the first contact surface between the soft component and the hard component is one of two first contact surfaces between the soft component and the hard component, the two first contact surfaces are approximately coplanar with each other in the width direction.

17. The blade according to claim 1, wherein:
the hard component includes the two second parts arranged on the two sides of the soft component in the thickness direction of the blade, each of the two second parts of the hard component is provided with the second member in contact with the soft component, a third contact surface between the soft component and the hard component and a fourth contact surface between the soft component and the hard component are approximately coplanar with each other in the width direction, the second contact surface is closer to the main body of the blade than the third contact surface and the fourth contact surface.

18. A propeller comprising:
a propeller hub; and
at least two propeller blades installed at the propeller hub and each including:
a main body; and
an edge disposed around a periphery of the main body,
a part of the edge including:
a soft layer; and
an intermediate layer connected between the soft layer and the main body, the intermediate layer including a soft component and a hard component stacked one on another when viewing in a cross-section along a width direction of the propeller blade or along a length direction of the propeller blade;
wherein:
the soft component includes two first parts arranged on two sides of the hard component in a thickness direction of the blade, each of the two first parts of the soft component is provided with a first member in contact with the hard component, the first member includes at least one of a groove, a through hole, a protrusion, or a rough layer, and a first contact surface between the soft component and the hard component is closer to the main body than a first edge of the first member in the width direction, the first contact surface being a contact surface between the soft component and the hard component that is closest to the main body in the width direction, and the first edge of the first member being an edge of the first member that is closest to the main body in the width direction; or the hard component includes two second parts arranged on two sides of the soft component in the thickness direction, each of the two second parts of the hard component is provided with a second member in contact with the soft component, the second member includes at least one of a groove, a through hole, a protrusion, or a rough layer, and a second contact surface between the soft component and the hard component is closer to the main body than a second edge of the second member in the width direction, the second contact surface being a contact surface between the soft component and the hard component that is closest to the main body in the width direction, and the second edge of the second member being an edge of the second member that is closest to the main body in the width direction.

19. An unmanned aerial vehicle comprising:

a body;

an arm mechanically coupled to the body;

a driver installed at the arm; and a propeller including:
  a propeller hub, the propeller being mounted at the driver through the propeller hub; and
  at least two propeller blades installed at the propeller hub and each including:
    a main body; and
    an edge disposed around a periphery of the main body, a part of the edge including:
      a soft layer; and
      an intermediate layer connected between the soft layer and the main body, the intermediate layer including a soft component and a hard component stacked one on another when viewing in a cross-section along a width direction of the propeller blade or along a length direction of the propeller blade;

wherein:

the soft component includes two first parts arranged on two sides of the hard component in a thickness direction of the blade, each of the two first parts of the soft component is provided with a first member in contact with the hard component, the first member includes at least one of a groove, a through hole, a protrusion, or a rough layer, and a first contact surface between the soft component and the hard component is closer to the main body than a first edge of the first member in the width direction, the first contact surface being a contact surface between the soft component and the hard component that is closest to the main body in the width direction, and the first edge of the first member being an edge of the first member that is closest to the main body in the width direction; or the hard component includes two second parts arranged on two sides of the soft component in the thickness direction, each of the two second parts of the hard component is provided with a second member in contact with the soft component, the second member includes at least one of a groove, a through hole, a protrusion, or a rough layer, and a second contact surface between the soft component and the hard component is closer to the main body than a second edge of the second member in the width direction, the second contact surface being a contact surface between the soft component and the hard component that is closest to the main body in the width direction, and the second edge of the second member being an edge of the second member that is closest to the main body in the width direction.

* * * * *